(12) United States Patent
Higdon

(10) Patent No.: US 11,802,654 B1
(45) Date of Patent: Oct. 31, 2023

(54) HANGING BRACKET FOR SCREEN ENCLOSURE

(71) Applicant: Daniel R. Higdon, Davenport, FL (US)

(72) Inventor: Daniel R. Higdon, Davenport, FL (US)

( * ) Notice: Subject to any disclaimer, the term of this patent is extended or adjusted under 35 U.S.C. 154(b) by 0 days.

(21) Appl. No.: 17/705,074

(22) Filed: Mar. 25, 2022

(51) Int. Cl.
*F16M 13/02* (2006.01)

(52) U.S. Cl.
CPC .................................. *F16M 13/02* (2013.01)

(58) Field of Classification Search
CPC .......... E06B 7/28; F16M 13/02; A47G 7/044; A47G 7/045; A47G 23/0225; A47G 25/0678
USPC ...................................................... 248/219.1
See application file for complete search history.

(56) References Cited

U.S. PATENT DOCUMENTS

| | | | | |
|---|---|---|---|---|
| 5,813,641 A * | 9/1998 | Baldwin | ............... | A47B 57/565 248/223.41 |
| 6,081,944 A * | 7/2000 | Edwards | ................... | E04H 4/14 239/289 |
| 9,439,529 B1 * | 9/2016 | Libertowski | ........... | A47K 10/10 |
| 2014/0165343 A1 * | 6/2014 | Gibbs | ..................... | F16B 5/123 24/545 |
| 2014/0252820 A1 * | 9/2014 | Botello | .............. | A47G 23/0225 248/223.41 |

* cited by examiner

*Primary Examiner* — Terrell L McKinnon
*Assistant Examiner* — Jerry Nmn Olivier
(74) *Attorney, Agent, or Firm* — Jason T. Daniel, Esq.; Daniel Law Offices, P.A.

(57) ABSTRACT

A hanging bracket for screen enclosures includes a main body having a first end with a first protrusion, a second end, a curved section, and an elongated arm having a first end with a second protrusion. Each of the protrusions include a shape and a size that is positionable within the opening of a spline channel in a screen enclosure frame. In the assembled orientation the main body and the arm are secured together to form a V-shaped member having the first protrusion and the second protrusion extending outward and locked within the spline channels. A plurality of apertures is provided along the main body for receiving hooks to suspend secondary items from the bracket.

14 Claims, 4 Drawing Sheets

HANGING BRACKET FOR SCREEN ENCLOSURE

TECHNICAL FIELD

The present invention relates generally to hanging bracket systems, and more particularly to a hanging bracket for screen enclosures.

BACKGROUND

The statements in this section merely provide background information related to the present disclosure and may not constitute prior art.

Many homes and other such locations include screened areas to provide people with a pleasant outdoor feeling while remaining protected from insects and adverse weather. In many instances, these screened areas function to enclose a pool or patio area, for example, and are generally fabricated using a plurality of thin wall aluminum extruded frame members which are positioned vertically and horizontally along the area. Each of these frame members include a plurality of spline channels along the outer edges. When abutting frame members are secured together, the spline channels are aligned and function to receive a screen enclosure material that is held in place via an elastomeric bead that is positioned within the spline channel of the respective frame members.

In operation, users often find a need to suspend or otherwise hang certain items within these screen enclosures. These items may include anything from shelving to plants to clothes hangers, among many others, for example. Accordingly, there are many known types of existing wall hanging brackets which can be secured to a wall, rail or other support structure using penetrating fasteners such as nails, screws, or bolts, for example. Unfortunately, due to the thin wall construction of screen enclosure frame members, these brackets are often unable to support much weight (e.g., less than 10 pounds) before the fasteners become dislodged from the soft metal that forms the frames. Moreover, once installed, a user cannot remove or reposition the bracket without leaving visible holes in the frames caused by the penetrating fasteners.

Accordingly, it would be beneficial to provide an improved hanging bracket system that can be easily and removably installed onto a screen enclosure frame member so as to overcome the drawbacks described above.

SUMMARY OF THE INVENTION

The present invention is directed to a hanging bracket for screen enclosures. One embodiment of the present invention can include an elongated arm and a main body having a first end, a second end, and a curved section. A pair of protrusions can extend outward from the first ends of the arm and the main body, and each of the protrusions can include a shape and a size that is positionable within the opening of a spline channel in a screen enclosure frame.

In one embodiment, the device can transition between an unassembled and assembled orientation. In the unassembled orientation, the main body and the elongated arm are not connected, and both can each be loosely attached to the spline channels of the frame member. In the assembled orientation the main body and the arm are secured together to form a V-shaped member having the first protrusion and the second protrusion extending outward and locked within the spline channels.

In one embodiment, the arm is secured to the main body using fasteners, and a plurality of apertures are provided for receiving secondary items to be suspended from the bracket.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
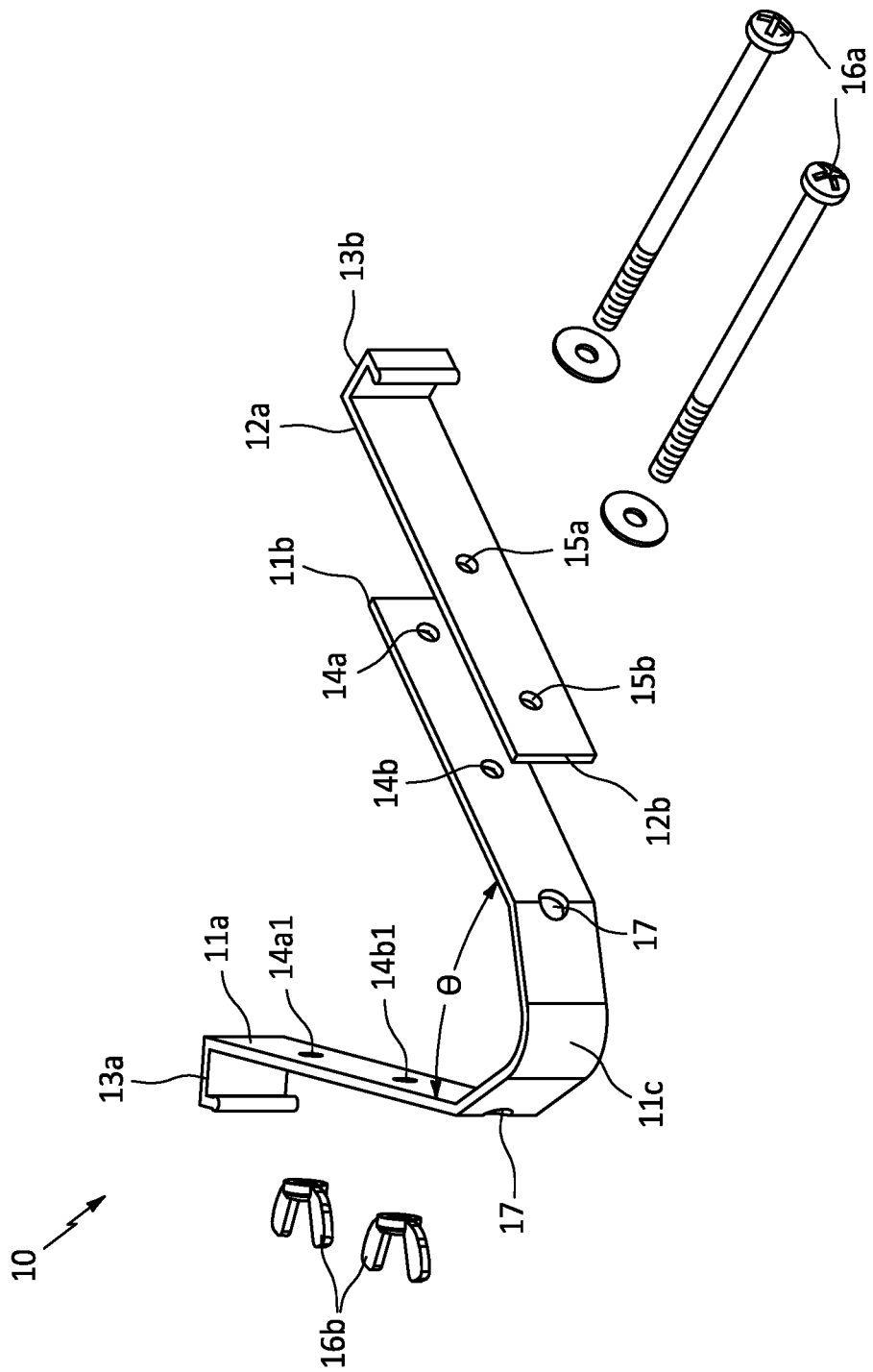
FIG. 1 is a perspective view of the screen enclosure hanging bracket that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

DEFINITIONS

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "fastener" includes any number of different elements that work alone or together to repeatedly join two items together in a nonpermanent manner. Several nonlimiting examples include nuts and bolts, opposing strips of hook and loop material (i.e., Velcro®), attractively-oriented magnetic elements, a thin, flexible strap with a notched surface and one end threaded through a locking mechanism (i.e., zip tie) at the other, tethers, buckles such as side release buckles, and compression fittings such as T-handle rubber draw latches, hooks, snaps and buttons, for example.

As defined herein, the terms "immovably positioned" and "immovably affixed" refer to the ability of the assembled bracket to remain secured onto a screen room frame member without moving when while receiving and hanging items having a weight of up to 50 pounds or more.

FIGS. 1-4 illustrate one embodiment of a hanging bracket for a screen enclosure 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in the drawings, the device 10 can include a main body 11, and a removeable arm 12 that function to engage the spline channels located along the edges of a screen enclosure frame member.

The main body 11 can include an elongated body having a first end 11a, a second end 11b and a curved portion 11c. The first end 11a can be positioned a first distance from the curved portion 11c, and the second end 11b can be positioned a second distance from the curved portion 11c. In the preferred embodiment, the curved portion 11c can include a bend θ of about 45 degrees, and the first distance will be greater than the second distance. Of course, any number of other angles and/or distances are also contemplated.

The removable arm 12 can include an elongated generally planar shaped body having a first end 12a, and a second end 12b. As described herein, the main body 11 and removable arm 12 may each be formed from materials that are, for example, relatively strong and stiff for their weight. Several nonlimiting examples include but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.).

In one embodiment, a pair of protrusions 13a and 13b can extend outward from the first ends 11a and 12a, respectively in opposite directions. In the preferred embodiment, the protrusions can extend 90 degrees from the respective body sections; however, any number of other angles are also contemplated. In various embodiments, the distal ends of the protrusions can include a shape and/or dimension that is complementary to the shape or size of a specific type of spline channel such as a flat channel or round, for example.

In one embodiment, two pairs of arm mounting holes 14a-14b and 14a1-14b1 can be positioned along the main body, and corresponding mounting holes 15a and 15b can be positioned along the removable arm. Each of these holes can include complementary shapes, sizes and positions along the respective members so as to allow apertures 14a-14a1-15a and 14b-14b1-15b to be aligned during assembly of the device.

In one embodiment, the device can include fasteners such as the illustrated bolts 16a and wing nuts 16b, for example. As shown, the fasteners can be positioned through the aligned holes in order to secure the removable arm onto the main body. Additionally, any number of other apertures 17 can be positioned along the main body 11 and/or removable arm 12 for use in receiving any number of articles to be suspended from the device 10 in operation.

Figure 2:
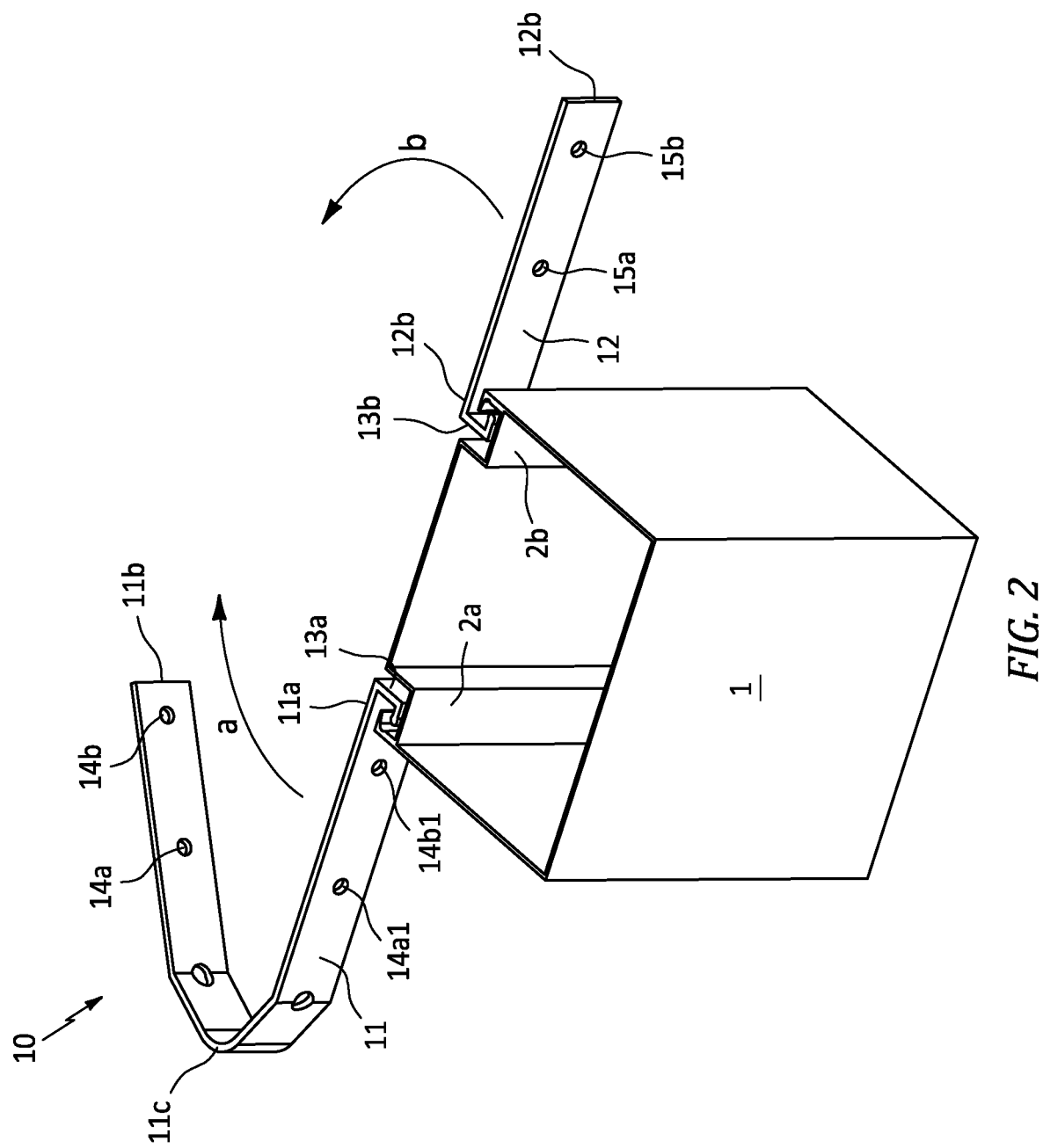
FIG. 2 is a top view of the bracket in the disassembled orientation, in accordance with one embodiment of the invention.

As shown at FIG. 2 when the device is in the unassembled orientation, the device components be positioned onto a horizontally or vertically oriented screen enclosure frame member 1 by orienting the main body 11 and removable arm 12 at roughly 90-degree angles to the frame member 1, and then positioning the respective protrusions 13a and 13b into the spline channels 2a and 2b of the frame member. When so positioned the components can be adjusted along the length of the spline channels referred to hereinafter as "adjustably positioned".

Figure 3:
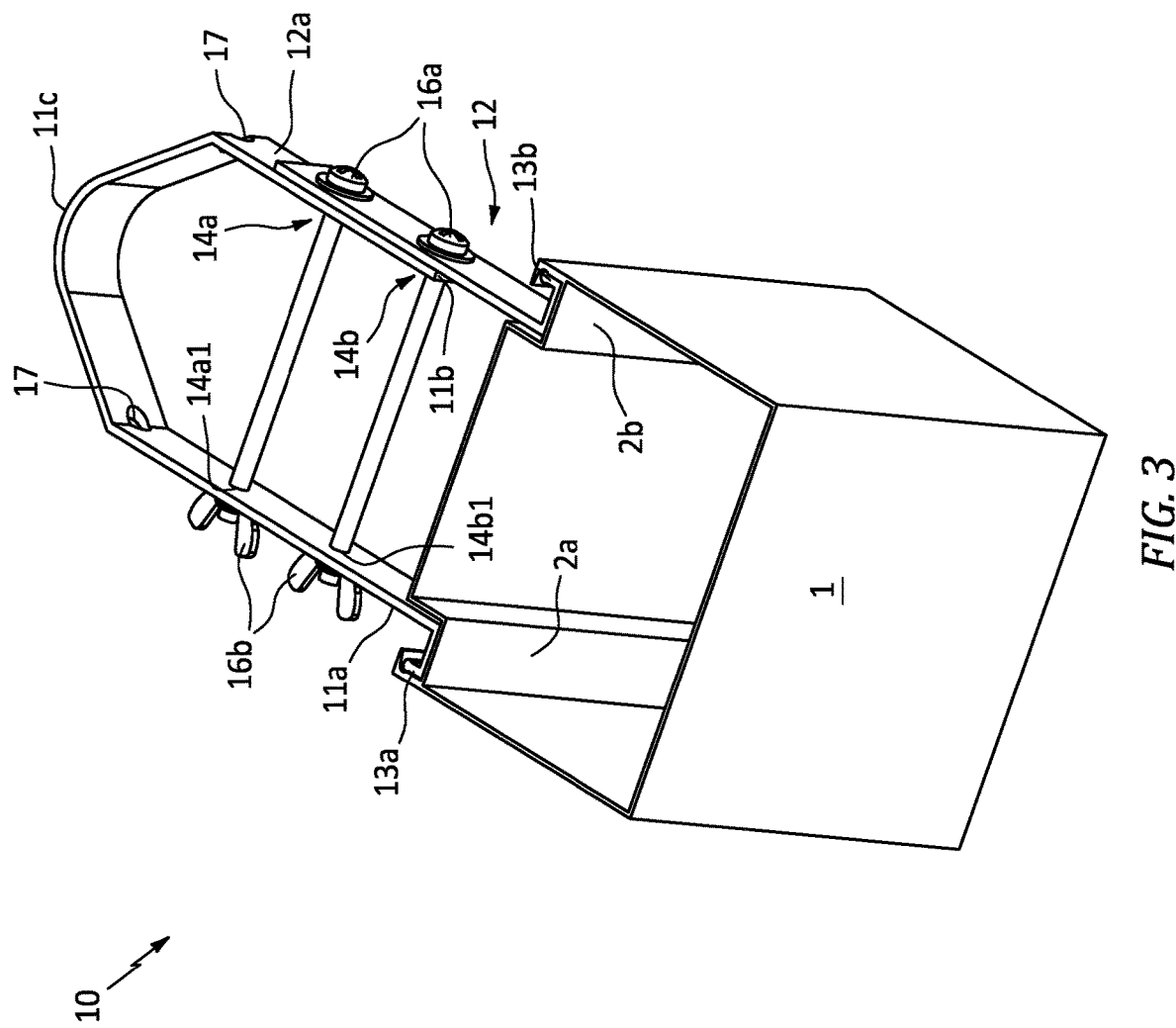
FIG. 3 is a top view of the bracket in an assembled orientation, in accordance with one embodiment of the invention.

Next, as shown by FIG. 3, when positioned in the desired location the device can transition to the assembled orientation whereby the main body 11 and arm 12 can be rotated toward each other (see arrows a and b) until the second end of the main body 11b makes contact a portion of the arm 12. At this time, holes 14a and 14a1 will be aligned with hole 15a, and holes 14b and 14b1 will be aligned with hole 15b, so that the fasteners 16a and 16b can be installed.

When so positioned, the assembled device 10 forms a V-shaped member wherein each of the protrusions are positioned equidistantly from the curved portion 11c and extend outward in opposite directions. In this orientation, the assembled device will remain securely and immovably affixed onto the frame member 1 via the tension imparted by the orientation of the arms with the protrusions locked within the channels.

Figure 4:
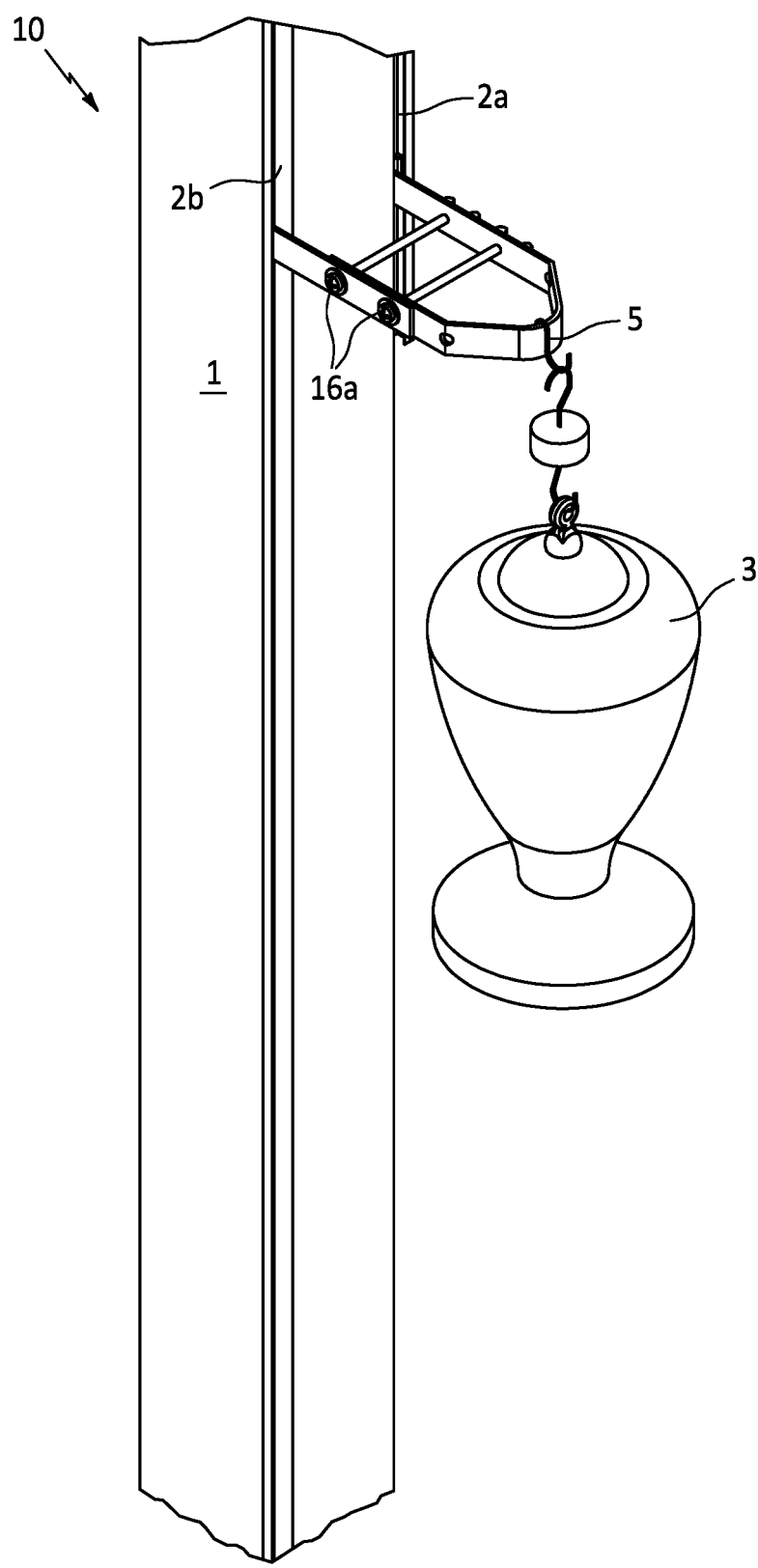
FIG. 4 is a perspective view of the bracket in operation in accordance with one embodiment of the invention.

As shown at FIG. 4. any number of secondary objects 3 such as plants, bird feeders or the like can be secured onto the device 10 directly or via hooks 5 which can be secured along the device body and/or through the apertures 17. Moreover, when the main body 11 and arm 12 are constructed from steel or aluminum, the device is capable of suspending materials weighing at or above 50 pounds.

Although illustrated with regard to a single device 10, other embodiments are contemplated wherein a plurality of brackets 10 are provided individually or as a kit to permit a user to hang an unlimited number of items from a screen enclosure. Moreover, because the bracket utilizes the spline channels and is held in place via the compressive force described above, it is possible for a user to remove and reposition the device at any time without damage to the support frame 1.

Accordingly, the hanging bracket for screen enclosures 10 functions in a novel manner that permits a user to removably attach a bracket to a screen enclosure frame without causing damage to the same.

As described herein, one or more elements of the bracket 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A bracket for screen enclosures, said bracket comprising:
   a main body having a first end, a second end and a curved section, said first end and second ends being oriented generally parallel to each other;
   a first protrusion positioned along the first end of the main body, said first protrusion including a shape and a size that is complementary to a shape and a size of an opening of a first spline channel of a screen enclosure frame;
   an elongated arm section having a first end and a second end;
   the second end of the elongated arm section being removably secured onto the second end of the main body and extending outward therefrom; and
   a second protrusion positioned along the first end of the arm section, said second protrusion including a shape and a size that is complementary to a shape and a size of an opening of a second spline channel of the screen enclosure frame;
   wherein in an unassembled orientation the arm section is not attached to the main body and in the assembled orientation the arm section is secured onto the main body, and
   in the assembled orientation the device forms a V-shaped member having the first protrusion and the second protrusion extending outward in opposite directions.

2. The device of claim 1, wherein the first protrusion is configured to be adjustably positioned within the first spline channel of the screen enclosure frame when the device is in the unassembled position.

3. The device of claim 2, wherein the second protrusion is configured to be adjustably positioned within the second spline channel of the screen enclosure frame when the device is in the unassembled position.

4. The device of claim 3, wherein in the assembled orientation, the first protrusion is immovably positioned within the first spline channel, and the second protrusion is immovably positioned within the second spline channel.

5. The device of claim 1, further comprising:
   a first set of holes that are positioned along the main body at a location between the curved section and the second end.

6. The device of claim 5, further comprising:
   a second set of holes that are positioned along the elongated arm section at a location between the first end and the second end.

7. The device of claim 6, wherein the first set of holes and the second set of holes are configured to be aligned when the arm is positioned against the main body.

8. The device of claim 7, further comprising:
   a pair of fasteners that are positioned through the aligned first set of holes and second set of holes, said fasteners functioning to secure the device in the assembled orientation.

9. The device of claim 6, further comprising:
   a third set of holes that are positioned along the main body at a location between the curved section and the first end.

10. The device of claim 9, wherein the first set of holes, the second set of holes and the third set of holes are configured to be aligned when the arm is positioned against the second end of the main body.

11. The device of claim 10, further comprising:
    a pair of fasteners that are positioned through the aligned first set of holes, second set of holes and third set of holes, said fasteners functioning to secure the device in the assembled orientation.

12. The device of claim 11, wherein the fasteners are aligned parallel with the curved middle portion and perpendicular with the first and second ends of the main body when the device is in the assembled orientation.

13. The device of claim 1, further comprising:
    a plurality of apertures that are positioned along at least one of the main body and the arm, each of the plurality of apertures being configured to engage a secondary object to be suspended from the device.

14. The device of claim 1, wherein each of the main body and the arm are constructed from metal.

* * * * *